US007296366B2

(12) United States Patent
Lin

(10) Patent No.: US 7,296,366 B2
(45) Date of Patent: Nov. 20, 2007

(54) ASSEMBLY OF A TAPE MEASURE AND A SCREWDRIVER

(75) Inventor: Ping-Lin Lin, Sanchong (TW)

(73) Assignee: Top-Long Industrial Co., Ltd., Taipei County (TW)

( * ) Notice: Subject to any disclaimer, the term of this patent is extended or adjusted under 35 U.S.C. 154(b) by 0 days.

(21) Appl. No.: 11/335,673

(22) Filed: Jan. 20, 2006

(65) Prior Publication Data

US 2007/0169365 A1 Jul. 26, 2007

(51) Int. Cl.
*G01B 3/10* (2006.01)
*B25B 15/00* (2006.01)

(52) U.S. Cl. ........................... 33/760; 33/769; 33/770; 7/164; 7/165

(58) Field of Classification Search .................. 33/759, 33/760, 761, 767, 768, 769, 770, 668; 7/163, 7/164, 165, 119, 108
See application file for complete search history.

(56) References Cited

U.S. PATENT DOCUMENTS 111,327 A * 1/1871 Dillingham .................... 7/164
3,119,424 A * 1/1964 Henry ........................... 81/20
4,015,337 A * 4/1977 Taylor ......................... 33/668
4,478,330 A * 10/1984 Lin ............................ 206/38
4,542,589 A * 9/1985 Yamamoto ................... 33/760
5,379,524 A * 1/1995 Dawson ....................... 33/768
6,098,226 A * 8/2000 Lin .............................. 7/165
6,286,745 B1 * 9/2001 Ackeret ....................... 227/76
6,725,560 B2 * 4/2004 Smith .......................... 33/668
6,913,368 B2 * 7/2005 Leu ............................ 362/119
7,013,516 B1 * 3/2006 Peters .......................... 7/146
7,111,349 B2 * 9/2006 Goldberg ....................... 7/164
2002/0064040 A1 * 5/2002 Padden ....................... 362/119

* cited by examiner

*Primary Examiner*—G. Bradley Bennett
*Assistant Examiner*—Amy R. Cohen
(74) *Attorney, Agent, or Firm*—Troxell Law Office, PLLC

(57) ABSTRACT

An assembly of a tape measure and a screwdriver includes a tape measure having a case, a ruler received in the case, an outlet being defined in the bottom of one side of the case for extension of the ruler, a receiving chamber being defined in one surface of the case and extending to an edge of the case, a pressing unit being disposed at one side of the case; and a screwdriver mechanism movably disposed in the receiving chamber of the case, the screwdriver mechanism having a positioning unit corresponding to the pressing unit. Thus, the assembly has functions of a tape measure and a screwdriver for easy use.

17 Claims, 9 Drawing Sheets

11
12
1
10
2
16
191
192
172
19
13
101

ASSEMBLY OF A TAPE MEASURE AND A SCREWDRIVER

BACKGROUND OF THE INVENTION (a) Field of the Invention

The present invention relates to a tape measure having a screwdriver, and particularly to an assembly of a tape measure and a foldable screwdriver for easy use.

(b) Description of the Prior Art

Referring to FIG. 15, a conventional tape measure includes a case 5 with an outlet 51 defined in one side thereof. A ruler 6 is received in the case 5 and has one end extending through the outlet 51. A pushing button 7 is movably disposed at one side edge of the case 5 corresponding to the outlet 51. A stop member 8 is coupled to the pushing button 7. The pushing button 7 and the stop member 8 is respectively disposed with tooth-like portions 71, 81 mated to each other.

In use, the pushing button 7 is pushed to move downwardly whereby the tooth-like portion 71 of the pushing button 7 engages with the tooth-like portion 81 of the stop member 8 to rotate the stop member 8 to press the ruler 6 thereby positioning the ruler 6 at the desired scale. When it is desired to withdraw the ruler 6, the pushing button 7 is pushed to move upwardly to rotate the stop member 8 through the tooth-like portions 71, 81 of the pushing button 7 and the stop member 8 engaging with each other, whereby the stop member 8 leaves the ruler 6 ⊢ and so the ruler 6 is recoiled in the case 5.

Though the conventional tape measure can be applied to measure via the ruler 6, the tape measure does not have other functions. When a user or worker goes to work, he has to take many tools besides a tape measure, for example, a screwdriver, a spanner, a pair of tongs and so on. The screwdriver is classified as flat type and cross type each having different sizes for corresponding to different types and sizes of screws. Therefore, a user or worker has to takes a lot of tools which are different in type or in size. However, it is not only inconvenient to take, but also inconvenient to store. It is desired to combine some tools, such as a tape measure and a screwdriver, together for easy use.

SUMMARY OF THE INVENTION

An object of the present invention is to provide an assembly of a tape measure and a screwdriver which has a foldable screwdriver mechanism movably disposed in a receiving chamber of a tape measure thereby facilitating to use.

To achieve the above object, an assembly of a tape measure and a screwdriver of the present invention includes a tape measure having a case, a ruler received in the case, an outlet being defined in the bottom of one side of the case for extension of the ruler, a receiving chamber being defined in one surface of the case and extending to an edge of the case, a pressing unit being disposed at one side of the case; and a screwdriver mechanism movably disposed in the receiving chamber of the case, the screwdriver mechanism having a positioning unit corresponding to the pressing unit.

DETAILED DESCRIPTION OF THE PREFERRED EMBODIMENTS

Figure 1:
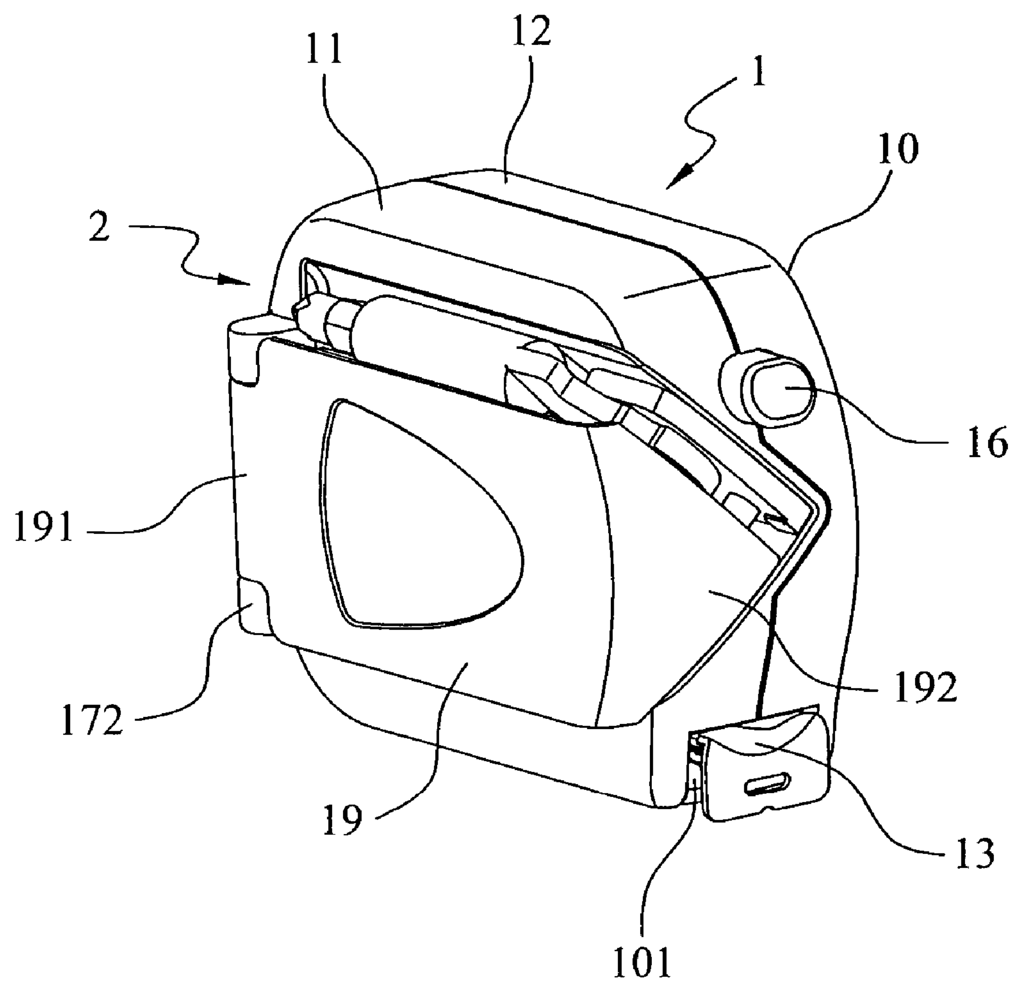
FIG. 1 is a perspective view of an assembly of a tape measure and a screwdriver of the present invention.
Figure 2:
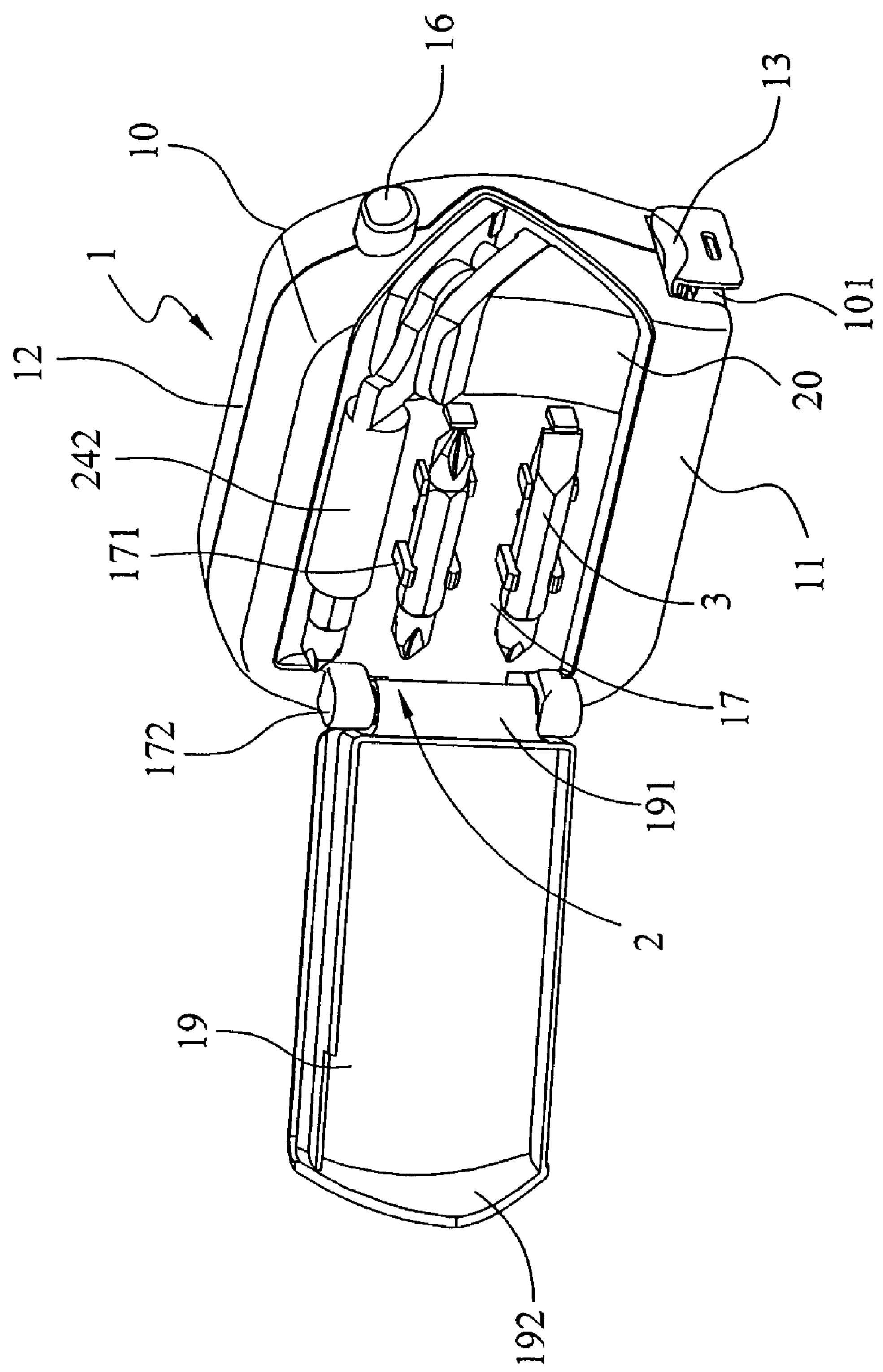
FIG. 2 is a perspective view showing a cover being opened.
Figure 3:
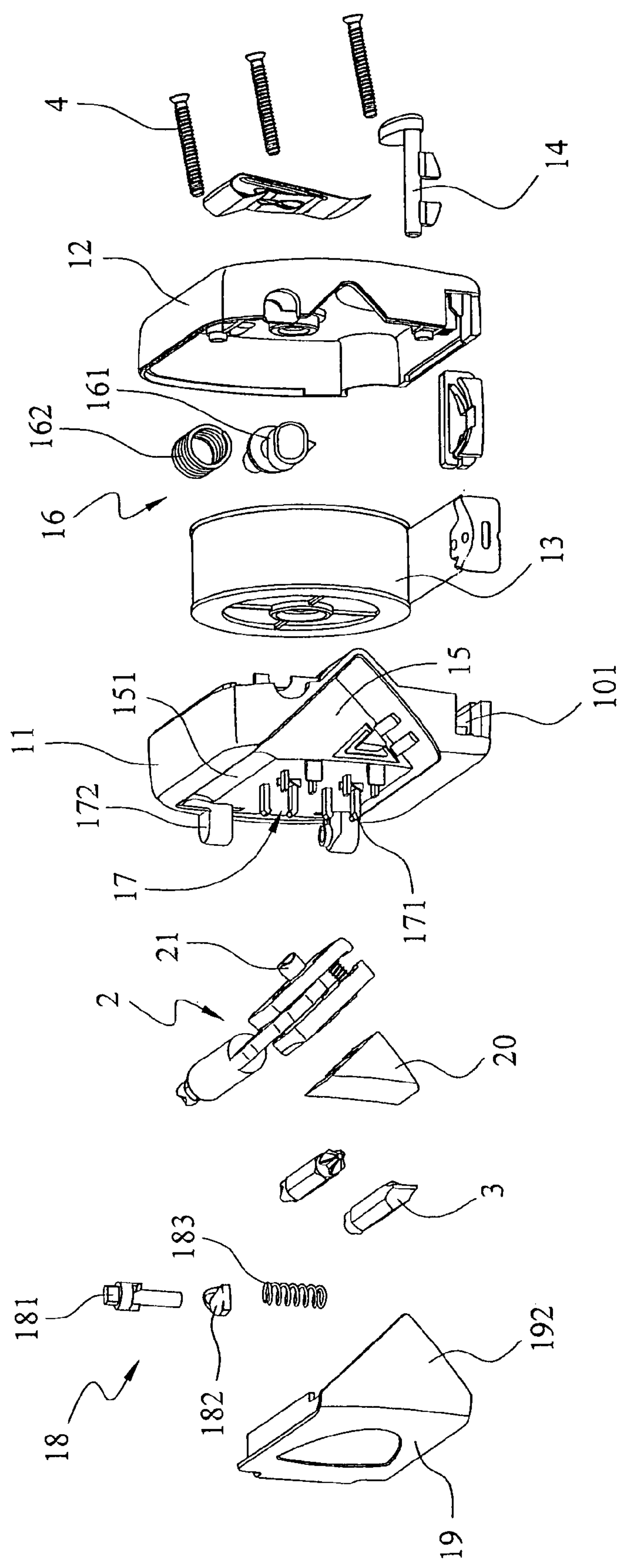
FIG. 3 is an exploded view of FIG. 1.
Figure 4:
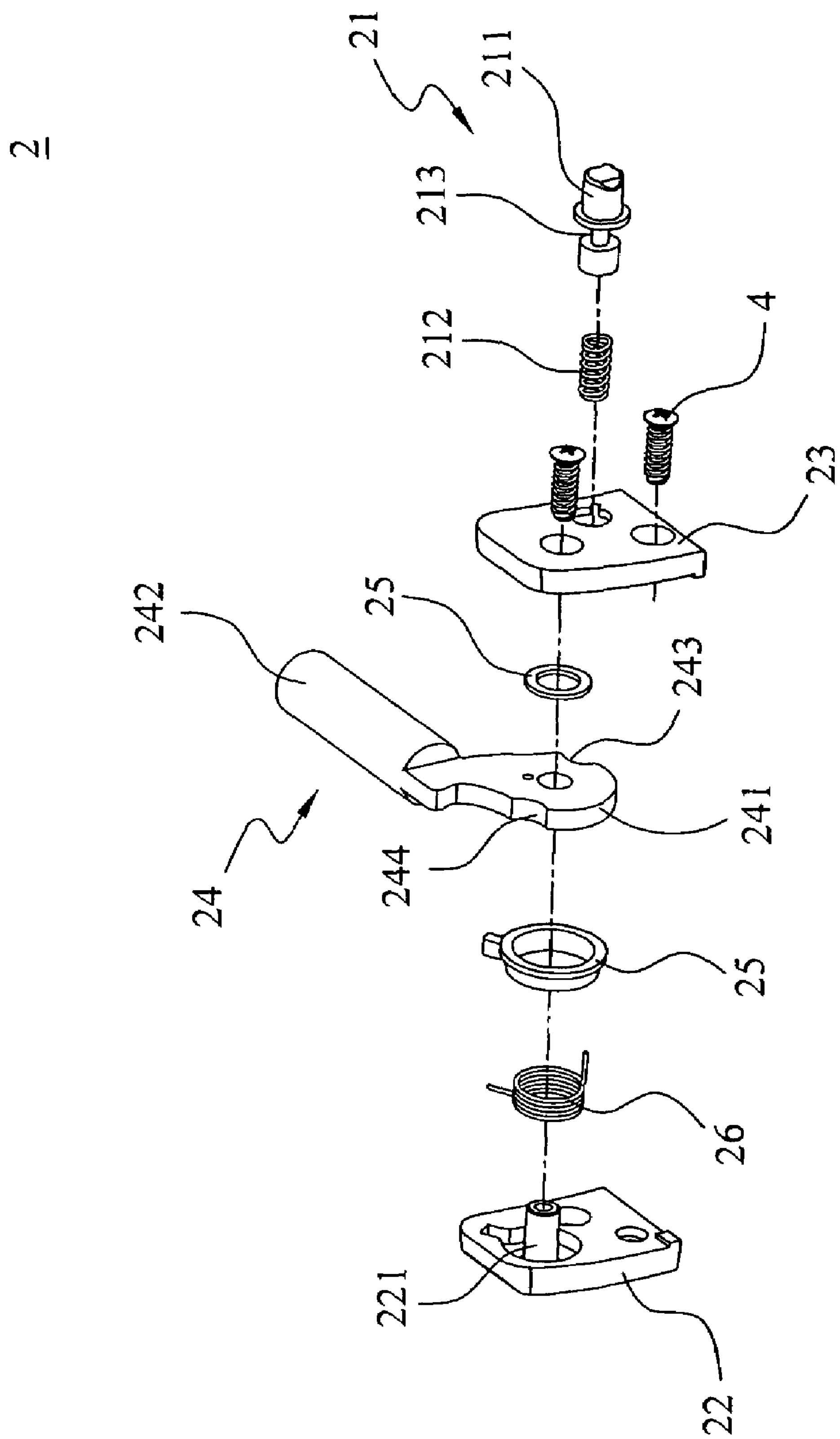
FIG. 4 is an exploded view of a screwdriver mechanism.

Referring to FIGS. 1-4, an assembly of a tape measure and a screwdriver of the present invention includes a tape measure 1 and a screwdriver mechanism 2 which is foldable for easy use.

The tape measure 1 includes upper and lower cases 11, 12 which are fixed by fixing members 4 to form a case 10, and a ruler 13 received in the case 10. The case 10 is defined with an outlet 101 in the bottom of one side thereof for extension of the ruler 13. An engaging member 14 is disposed at the case 10 adjacent one side of the outlet 101 for correspondingly pressing one surface of the ruler 13. A receiving chamber 15 is defined in one surface of the upper case 11 extending to one edge of the upper case 11. Two opposite sides of the receiving chamber 15 slantingly extend toward the bottom and so are generally V-shaped. An arcuate recessed portion 151 is defined in the upper case 11 in communication with one side of the receiving chamber 15. A pressing unit 16 is disposed at one side of the case 10. the pressing unit 16 includes a pressing button 161 and a resilient member 162 disposed at one end of the pressing button 161. A storage zone 17 is defined in one surface of the upper case 11 adjacent the receiving chamber 15. The storage zone 17 is disposed with a plurality of latches 171 for correspondingly storing a plurality of tool heads 3. A cover 19 is movably disposed at one side of the storage zone 17 via a rotation shaft unit 18. A pair of pivot portions 172 are disposed at one side of the storage zone 17 for rotatably receiving the rotation shaft unit 18 therebetween. The cover 19 is defined with a sleeve 191 corresponding to the pivot portions 172 for receiving the rotation shaft unit 18. The other side of the cover 19 is disposed with a blocking board 192. The rotation shaft unit 18 includes a shaft pole 181 extending through the sleeve 191 and into the pivot portions 172, a positioning plate 182 sleevingly attached to the shaft pole 181, and a resilient member 183 sleevingly attached to the shaft pole 181 and abutting the positioning plate 182.

The screwdriver mechanism 2 is movably disposed at one side of the receiving chamber 15 of the case 10. A block 20 is disposed at the other side of the receiving chamber 15. A positioning unit 21 is disposed at the screwdriver mechanism 2 corresponding to the pressing unit 16. The screwdriver mechanism 2 at least includes first and second pressing boards 22, 23 which are connected by a plurality of fixing members 4. A screwdriver unit 24 is movably disposed between the first and second pressing boards 22, 23. Two gaskets 25 are respectively disposed between the screwdriver unit 24 and the first and second pressing boards 22, 23. Two ends of a spring 26 are respectively connected to the first pressing board 22 and the screwdriver unit 24.

The positioning unit 21 is disposed at the second pressing board 23 corresponding to the screwdriver unit 24. The first pressing board 22 has a shaft body 221 movably connected to the screwdriver unit 24. The spring 26 is sleevingly attached to the shaft body 221. The screwdriver unit 24 includes a connection board 241 movably disposed between the first and second pressing boards 22, 23, and a sleeve 242 extending from one end of the connection board 241. The sleeve 242 is for movable insertion of the tool head 3. The connection board 241 is defined with two cutouts 243, 244 in two side edges thereof respectively corresponding to the positioning unit 21. The positioning unit 21 includes a positioning post 211, and a resilient member 212 having two ends respectively abutting the first pressing board 22 and the positioning post 211. The positioning post 211 is annularly defined with a recess 213. Therefore, the tape measure 1 and the screwdriver mechanism 2 are combined to form the assembly of the present invention.

Since the ruler 13 of the tape measure 1 can be drawn or retracted in the conventional manner, the tape measure is not detailedly described herein. Functions and effects that the assembly of the present invention has are detailedly described as follows.

Figure 5:
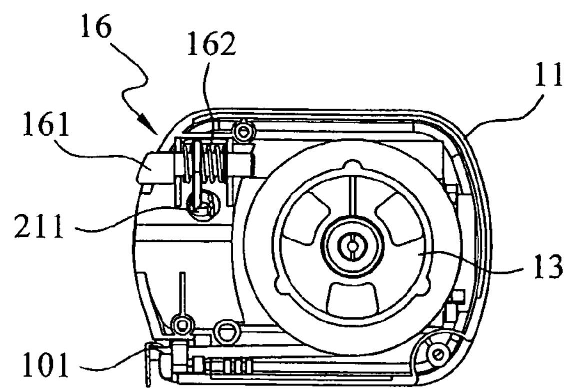
FIGS. 5, 6 and 7 show a screwdriver mechanism being pulled out.
Figure 6:
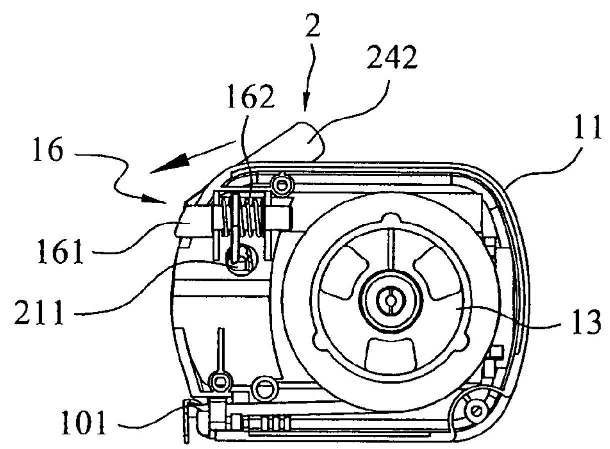
Figure 7:
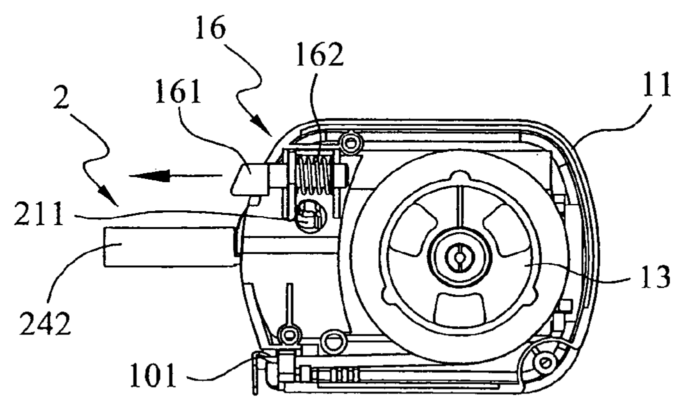

Referring to FIGS. 5, 6 and 7, when it is desired to pull out the screwdriver mechanism 2, the pressing unit 16 is pressed to enable the pressing button 161 of the pressing unit 16 to press the positioning post 211 of the positioning unit 21. So the positioning post 211 slides in the cutout 243 of the connection board 241 to enable the connection board 241 to fall into the recess 213 of the positioning post 211. Meanwhile, the screwdriver unit 24 is resiliently moved by the rotation resilience of the spring 26. Therefore, the screwdriver unit 24 rotates 180 degrees. Then the positioning post 211 of the positioning unit 21 is returned by the push of the resilient member 212. The pressing button 161 of the pressing unit 16 is returned through the resilient member 162 whereby the positioning post 211 engages with the cutout 244 of the connection board 241. The sleeve 242 of the screwdriver unit 24 is positioned at one side of the case 10. Thus, the screwdriver mechanism 2 is pulled out.

Figure 8:
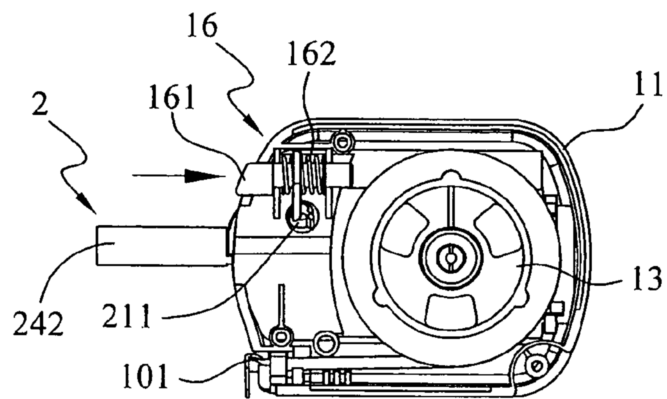
FIGS. 8, 9 and 10 show a screwdriver mechanism being closed.
Figure 9:
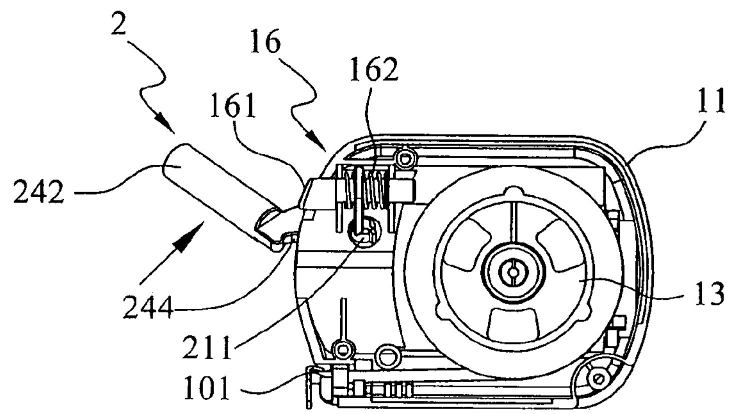
Figure 10:
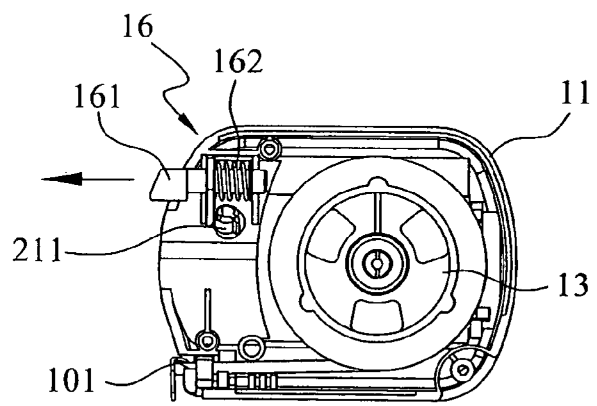
Figure 11:
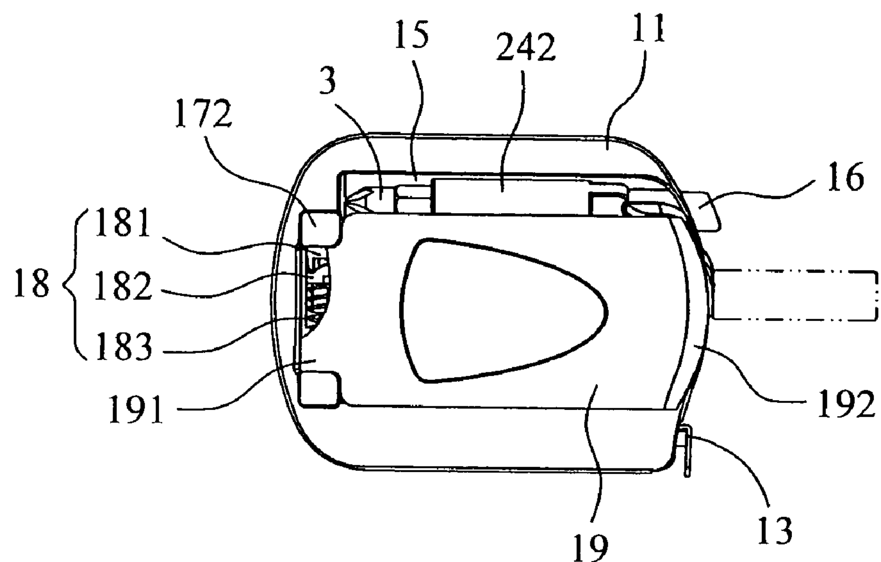
FIGS. 11 and 12 are perspective view of the assembly of the present invention.
Figure 12:
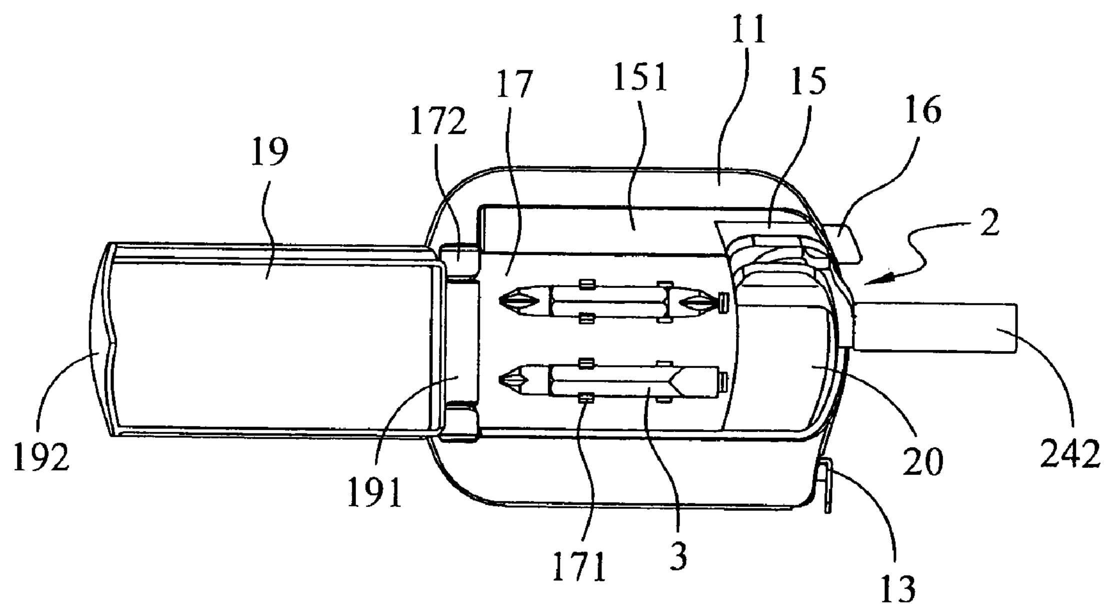
Figure 13:
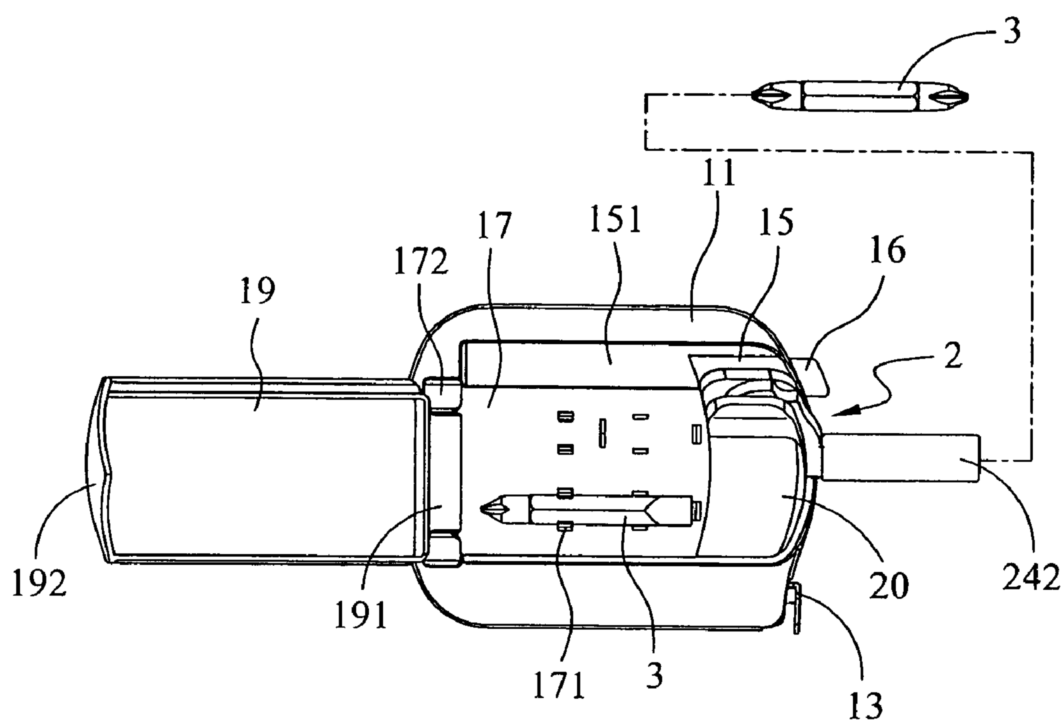
FIG. 13 is a perspective view showing a tool head to be assembled.
Figure 14:
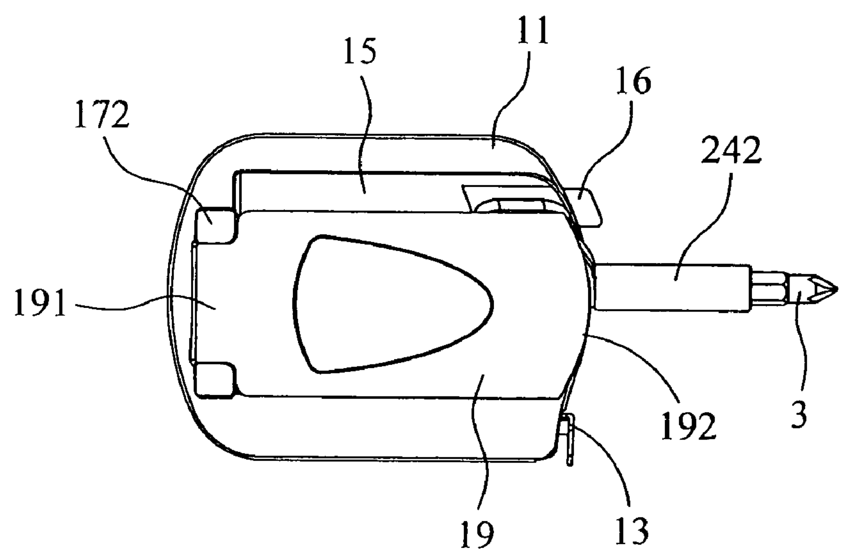
FIG. 14 is a perspective view showing the tool head being assembled.
Figure 15:
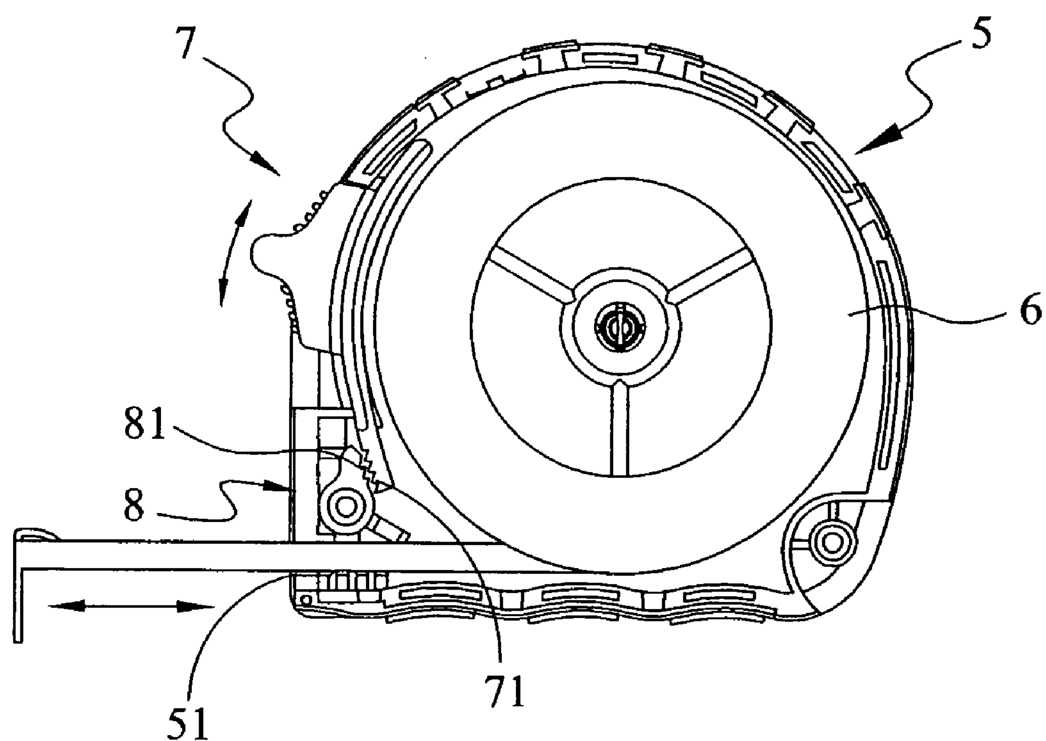
FIG. 15 is a cross sectional view of a conventional tape measure.

Referring to FIGS. 8, 9 and 10, when it is desired to fold the screwdriver mechanism 2, the pressing unit 16 is pressed to enable the pressing button 161 to press the positioning post 211 of the positioning unit 21 whereby the positioning post 211 slides in the cutout 244 of the connection board 241. Therefore, the connection board 241 falls into the recess 213 of the positioning post 211. The screwdriver unit 24 is closed toward the arcuate recessed portion 151 to enable the positioning post 211 to engage with the cutout 243 of the connection board 241. Then the positioning post 211 of the positioning unit 21 is returned through the push of the resilient member 212. Meanwhile, the pressing button 161 of the pressing unit 16 is returned through the resilient member 162 to enable the sleeve 242 of the screwdriver unit 24 to be folded in the arcuate recessed portion 151. Thus, the screwdriver mechanism 2 is closed.

Referring to FIGS. 11, 12, 13 and 14, when a user wants to replace the tool head 3 of the screwdriver mechanism 2, the cover 19 is turned on. During turning on the cover 19, the cover 19 actuates the positioning plate 182 to ratate about the shaft pole 181 through the compressing resilience of the resilient member 183 on the shaft pole 181 of the rotation shaft unit 18. Meanwhile, the cover 19 is driven to rotate 165 degrees to be turned on and so the storage zone 17 is exposed. Therefore, a user can select the tool heads 3 in the storage zone 17 and take down the tool head 3 from the latches 171 and then directly insert the tool head 3 into the sleeve 242 of the screwdriver unit 24. Then the cover 19 is closed. Thus, the tool head 3 is assembled or replaced in the sleeve 242 of the screwdriver mechanism 2.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An assembly of a tape measure and a screwdriver comprising:

a tape measure having a case, a ruler received in the case, an outlet being defined in the bottom of one side of the case for extension of the ruler, a receiving chamber being defined in one surface of the case and extending to an edge of the case, a pressing unit being disposed at one side of the case; and a screwdriver mechanism movably disposed in the receiving chamber of the case, the screwdriver mechanism having a positioning unit corresponding to the pressing unit, wherein a storage zone is defined in one surface of the case adjacent the receiving chamber, a cover is movably disposed at one side of the storage zone through a rotation shaft unit, wherein the cover has a sleeve at one side thereof for extension of the rotation shaft unit, and a blocking board at the other side thereof.

2. The assembly of claim 1, wherein the case comprises an upper case and a lower case.

3. The assembly of claim 1, wherein the storage zone is disposed with a plurality of latches for storage of a plurality of tool heads, a pair of pivot portions is disposed at one side of the storage zone for extension of the rotation shaft unit.

4. The assembly of claim 1, wherein the rotation shaft unit comprises a shaft pole, a positioning plate sleevingly disposed at the shaft pole, and a resilient member sleevingly disposed at the shaft pole and abutting the positioning plate.

5. The assembly of claim 1, wherein an engaging member is disposed at one side of the case adjacent the outlet for correspondingly pressing one surface of the ruler.

6. The assembly of claim 1, wherein opposite sides of the receiving chamber slantingly extend toward the bottom thereof and so are generally V-shaped, the screwdriver mechanism is disposed at one side of the receiving chamber, a block is disposed at the other side of the receiving chamber for engaging with the screwdriver mechanism.

7. The assembly of claim 1, wherein an arcuate recessed portion is disposed in communication with one side of the receiving chamber.

8. The assembly of claim 1, wherein the pressing unit comprises a pressing button and a resilient member disposed at one end of the pressing button.

9. The assembly of claim 1, wherein the screwdriver mechanism at least comprises first and second pressing boards, a screwdriver unit is movably disposed between the first and second pressing boards, two ends of a spring respectively abut the first pressing board and the screwdriver unit, the positioning unit is disposed at the second pressing board for corresponding to the screwdriver unit.

10. The assembly of claim 1, wherein the positioning unit comprises a positioning post, and a resilient member abutting against the positioning post at one end thereof, the position pose is annularly defined with a recess.

11. An assembly of a tape measure and a screwdriver comprising:

a tape measure having a case, a ruler received in the case, an outlet being defined in the bottom of one side of the case for extension of the ruler, a receiving chamber being defined in one surface of the case and extending to an edge of the case, a pressing unit being disposed at one side of the case; and a screwdriver mechanism movably disposed in the receiving chamber of the case, the screwdriver mechanism having a positioning unit corresponding to the pressing unit, wherein the screwdriver mechanism at least comprises first and second pressing boards, a screwdriver unit is movably disposed between the first and second pressing boards, two ends of a spring respectively abut the first pressing board and the screwdriver unit, the positioning unit is disposed at the second pressing board for corresponding to the screwdriver unit.

12. The assembly of claim 11, wherein the first and second pressing boards are connected by a plurality of fixing members.

13. The assembly of claim 11, wherein the first pressing board is disposed with a shaft body movably connected to the screwdriver unit, the spring is sleevingly disposed at the shaft body.

14. The assembly of claim 11, wherein the screwdriver unit comprises a connection board movably connected between the first and second pressing boards, and a sleeve extending from one end of the connection board, two side edges of the connection board are disposed with cutouts respectively corresponding to the positioning unit.

15. The assembly of claim 11, wherein two gaskets are respectively disposed between the screwdriver unit and the first and second pressing boards.

16. An assembly of a tape measure and a screwdriver comprising:

a tape measure having a case, a ruler received in the case, an outlet being defined in the bottom of one side of the case for extension of the ruler, a receiving chamber being defined in one surface of the case and extending to an edge of the case, a pressing unit being disposed at one side of the case; and a screwdriver mechanism movably disposed in the receiving chamber of the case, the screwdriver mechanism having a positioning unit corresponding to the pressing unit, wherein a storage zone is defined in one surface of the case adjacent the receiving chamber, a cover is movably disposed at one side of the storage zone through a rotation shaft unit, wherein the rotation shaft unit comprises a shaft pole, a positioning plate sleevingly disposed at the shaft pole, and a resilient member sleevingly disposed at the shaft pole and abutting the positioning plate.

17. An assembly of a tape measure and a screwdriver comprising:

a tape measure having a case, a ruler received in the case, an outlet being defined in the bottom of one side of the case for extension of the ruler, a receiving chamber being defined in one surface of the case and extending to an edge of the case, a pressing unit being disposed at one side of the case; and a screwdriver mechanism movably disposed in the receiving chamber of the case, the screwdriver mechanism having a positioning unit corresponding to the pressing unit, wherein opposite sides of the receiving chamber slantingly extend toward the bottom thereof and so are generally V-shaped, the screwdriver mechanism is disposed at one side of the receiving chamber, a block is disposed at the other side of the receiving chamber for engaging with the screwdriver mechanism.

* * * * *